US008888353B2

(12) United States Patent
Wang et al.

(10) Patent No.: US 8,888,353 B2
(45) Date of Patent: Nov. 18, 2014

(54) BACKLIGHT MODULE AND ASSEMBLY METHOD THEREOF

(71) Applicant: AU Optronics Corp., Hsin-Chu (TW)

(72) Inventors: Cheng-Yu Wang, Hsin-Chu (TW); Cheng-Min Tsai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 126 days.

(21) Appl. No.: 13/691,848

(22) Filed: Dec. 3, 2012

(65) Prior Publication Data
US 2014/0029302 A1 Jan. 30, 2014

(30) Foreign Application Priority Data

Jul. 30, 2012 (TW) .............................. 101127473 A

(51) Int. Cl.
F21V 7/04 (2006.01)
F21V 8/00 (2006.01)
F21V 7/00 (2006.01)
F21V 17/10 (2006.01)
F21S 8/00 (2006.01)
F21V 19/02 (2006.01)
G02F 1/1335 (2006.01)

(52) U.S. Cl.
CPC ................ *G02B 6/0031* (2013.01); *F21V 7/00* (2013.01); *F21V 17/10* (2013.01); *F21S 8/00* (2013.01); *F21V 19/02* (2013.01); *G02F 1/1335* (2013.01)
USPC .......................................... 362/612; 362/621

(58) Field of Classification Search
CPC ................... G02F 1/133608; G02F 1/133615; G02B 6/0068; G02B 6/0091; G02B 6/009; G02B 6/0073
USPC .................................. 362/632–634, 621, 612
See application file for complete search history.

(56) References Cited

U.S. PATENT DOCUMENTS

| 4,498,737 | A | * | 2/1985 | Doggett | 362/191 |
| 4,757,428 | A | * | 7/1988 | Ryder et al. | 362/549 |
| 6,039,457 | A | * | 3/2000 | O'Neal | 362/388 |
| 7,425,082 | B1 | * | 9/2008 | Jones | 362/285 |
| 2004/0212981 | A1 | * | 10/2004 | Wang et al. | 362/31 |
| 2006/0006777 | A1 | | 1/2006 | Lo | |

(Continued)

FOREIGN PATENT DOCUMENTS

| CN | 1580896 A | 2/2005 |
| TW | M263518 | 5/2005 |
| TW | 200825331 | 6/2008 |
| TW | I351561 | 11/2011 |

*Primary Examiner* — Julie Bannan
(74) *Attorney, Agent, or Firm* — Winston Hsu; Scott Margo

(57) ABSTRACT

A backlight module includes a light guide plate with at least one light incident surface, and a light source structure arranged at a side of the light guide plate. The light source structure includes a reflection cover and at least one light emitting module. At least one positioning pin is arranged on the reflection cover. The at least one light emitting module is installed on the reflection cover and corresponding to the at least one light incident surface. The at least one light emitting module is fixed on the positioning pin in a rotatable manner, such that the at least one light emitting module can rotate around the positioning pin as an axis when the reflection cover is combined with the light guide plate, so as to allow the at least one light emitting module facing the at least one light incident surface.

19 Claims, 8 Drawing Sheets

(56) References Cited

U.S. PATENT DOCUMENTS

2007/0263388 A1* 11/2007 Lai et al. .................. 362/287
2008/0031008 A1* 2/2008 Ogino et al. .................. 362/611
2012/0099085 A1* 4/2012 Chen et al. .................. 353/98
2012/0170309 A1* 7/2012 Kim et al. .................. 362/606

* cited by examiner

BACKLIGHT MODULE AND ASSEMBLY METHOD THEREOF

BACKGROUND OF THE INVENTION

1. Field of the Invention

The present invention relates to a backlight module and an assembly method thereof, and more particularly, to a backlight module and an assembly method capable of improving efficiency of the backlight module.

2. Description of the Prior Art

Since a liquid crystal display panel can not emit light by itself, a liquid crystal display device must utilize a backlight module to provide light to the liquid crystal display panel for displaying images. Generally, the backlight module is arranged behind the liquid crystal display panel, and utilizes combinations of light sources and optical components (such as light guide plate, optical diffuser film, optical reflection film) to provide a uniform light source with high brightness to the liquid crystal display panel. The liquid crystal display panel then controls pixels to display corresponding colors according to display data for displaying images. Base on location of the light source, the backlight module can be a direct type backlight module or a side-light type backlight module. The direct type backlight module is directly installed in rear of the liquid crystal display panel, and the direct type backlight module is capable of controlling light sources at different areas independently. Therefore, the direct type backlight module can flexibly provide backlight to the liquid crystal display panel with different brightness at different area. On the other hand, the side-light type backlight module is configured with light sources at a side of a light guide plate, and the light guide plate guides light from the light sources to the liquid crystal display panel. Therefore, thickness of the liquid crystal display device utilizing the side-light type backlight module can be reduced.

Because the light guide plate of the side-light type backlight module guides the light incident from a lateral side of the light guide plate to the liquid crystal display in front of the light guide plate, a contact status between alight emitting surface of the light source and a light incident surface of the light guide plate may affect efficiency of the side-light type backlight module. If the light emitting surface of the light source and the light incident surface of the light guide plate are not contacted with each other by a plane contact manner due to dimension tolerance or poor assembly, the light generated by the light source can not fully enter the light guide plate, and thus cause problems of light leakage and uneven backlight, such that the side-light type backlight module may have poor efficiency.

SUMMARY OF THE INVENTION

The present invention provides a backlight module, which comprises a light guide plate with at least one light incident surface, and a light source structure arranged at a side of the light guide plate. The light source structure comprises a reflection cover and at least one light emitting module. At least one positioning pin is arranged on the reflection cover. The at least one light emitting module is installed on the reflection cover and corresponding to the at least one light incident surface. The at least one light emitting module is fixed on the positioning pin in a rotatable manner, such that the at least one light emitting module can rotate around the positioning pin as an axis when the reflection cover is combined with the light guide plate, so as to allow a light emitting surface of the at least one light emitting module facing the at least one light incident surface.

The present invention further provides a light source structure, which comprises a reflection cover and at least one light emitting module. At least one positioning pin is arranged on the reflection cover. The at least one light emitting module is installed inside the reflection cover and fixed on the positioning pin in a rotatable manner, such that the at least one light emitting module can rotate around the positioning pin as an axis with rotational degrees of freedom in the reflection cover.

The present invention further provides an assembly method of a backlight module. The method comprises arranging a reflection cover with at least one positioning pin; arranging the positioning pin to pass through a through hole of alight emitting module for installing the light emitting module on the reflection cover; and pushing one side of a light guide plate into the reflection cover along a base plate of the reflection cover, and driving the light emitting module to rotate, such that a light emitting surface of the light emitting module contacts with a light incident surface of the light guide plate by a plane contact manner.

In contrast to the prior art, the light emitting module of the backlight module of the present invention can rotate when being assembled, such that the light emitting surface of the light emitting module can contact with the light incident surface of the light guide plate by a plane contact manner. Therefore, the backlight module of the present invention can solve problems of light leakage and uneven backlight caused by detachment between the light emitting surface of the light emitting module and the light incident surface of the light guide plate, so as to further increase brightness and efficiency of the backlight module. In addition, the assembly method of the backlight module of the present invention can easily adjust angles of the light emitting module and then fix the light emitting module on the reflection cover, so as to further improve assembly efficiency of the backlight module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
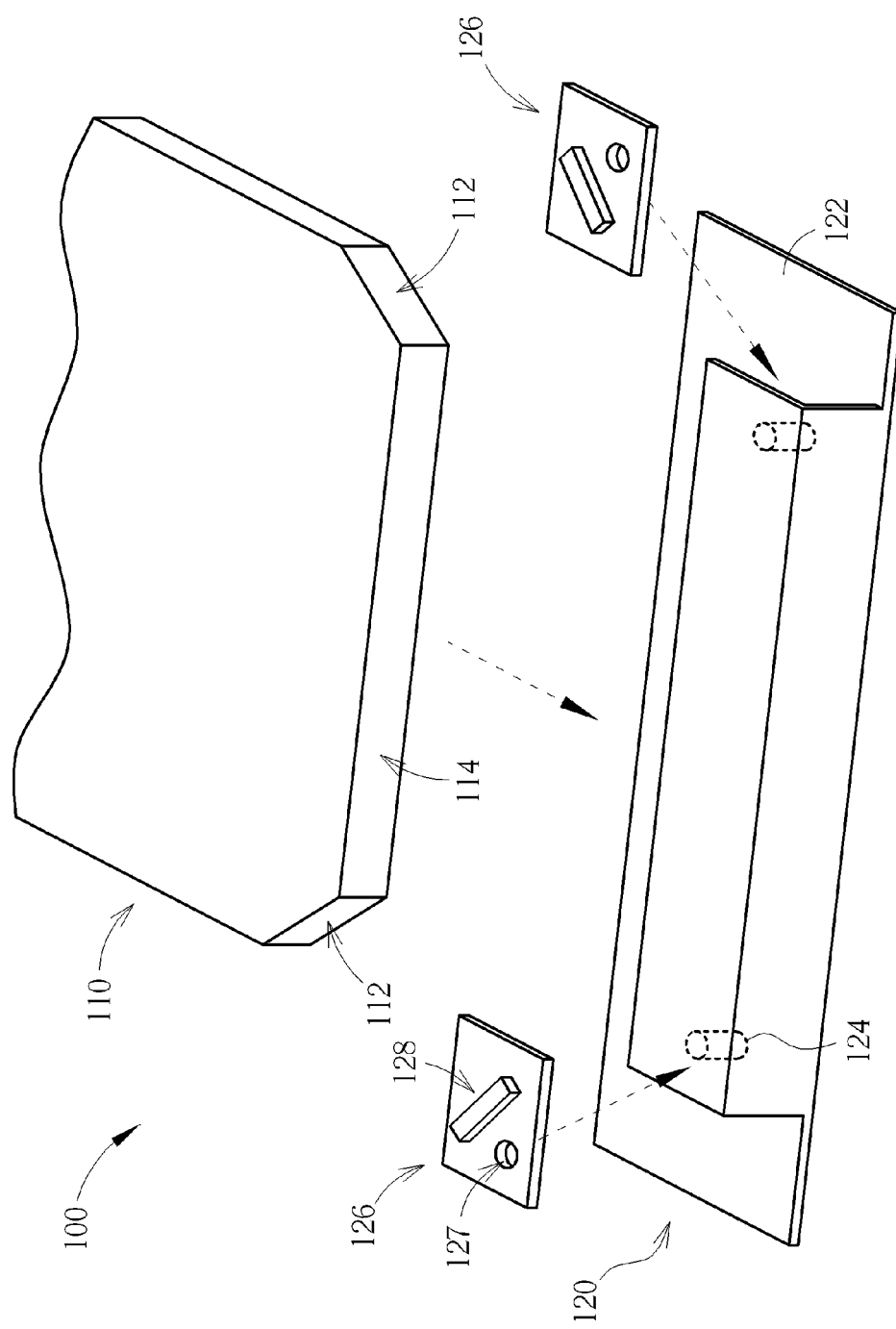
FIG. 1 is a diagram showing an explosive view of a backlight module of the present invention.
Figure 2:
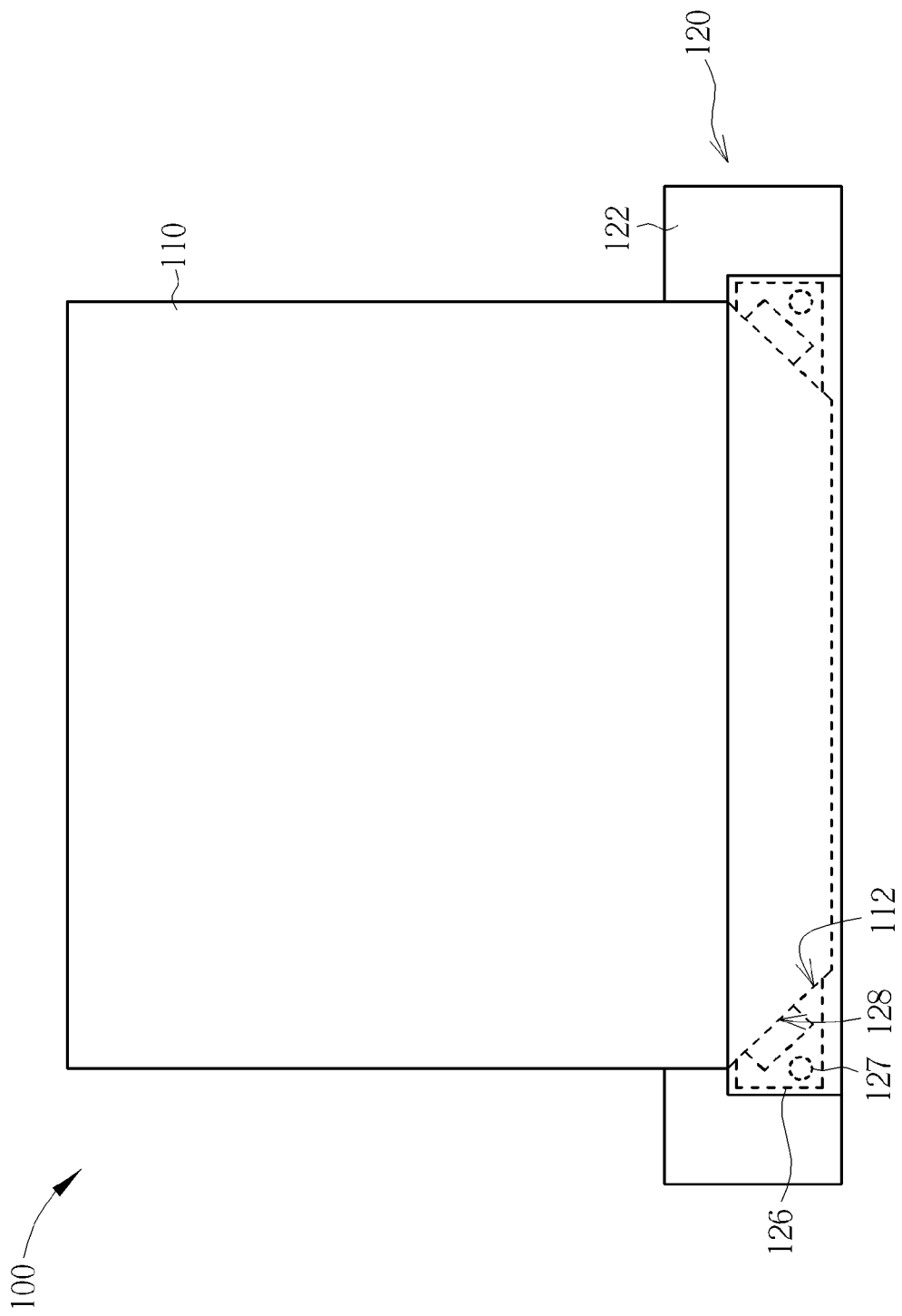
FIG. 2 is a diagram showing assembly of the backlight module of the present invention.
Figure 3:
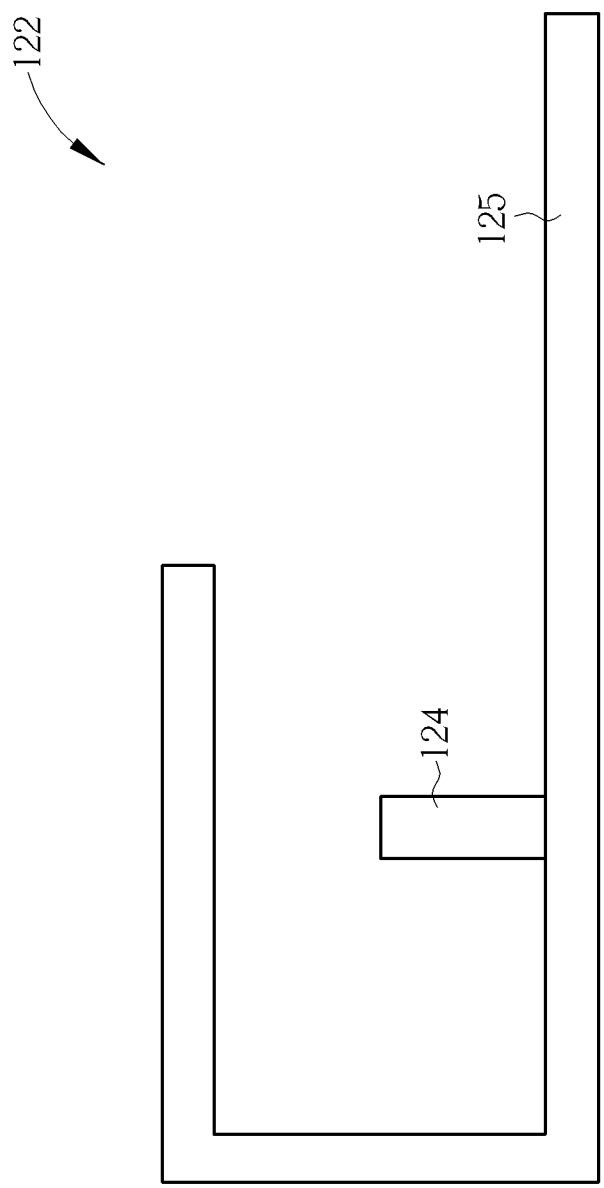
FIG. 3 is a diagram showing a side view of a reflection cover of the backlight module.
Figure 4:
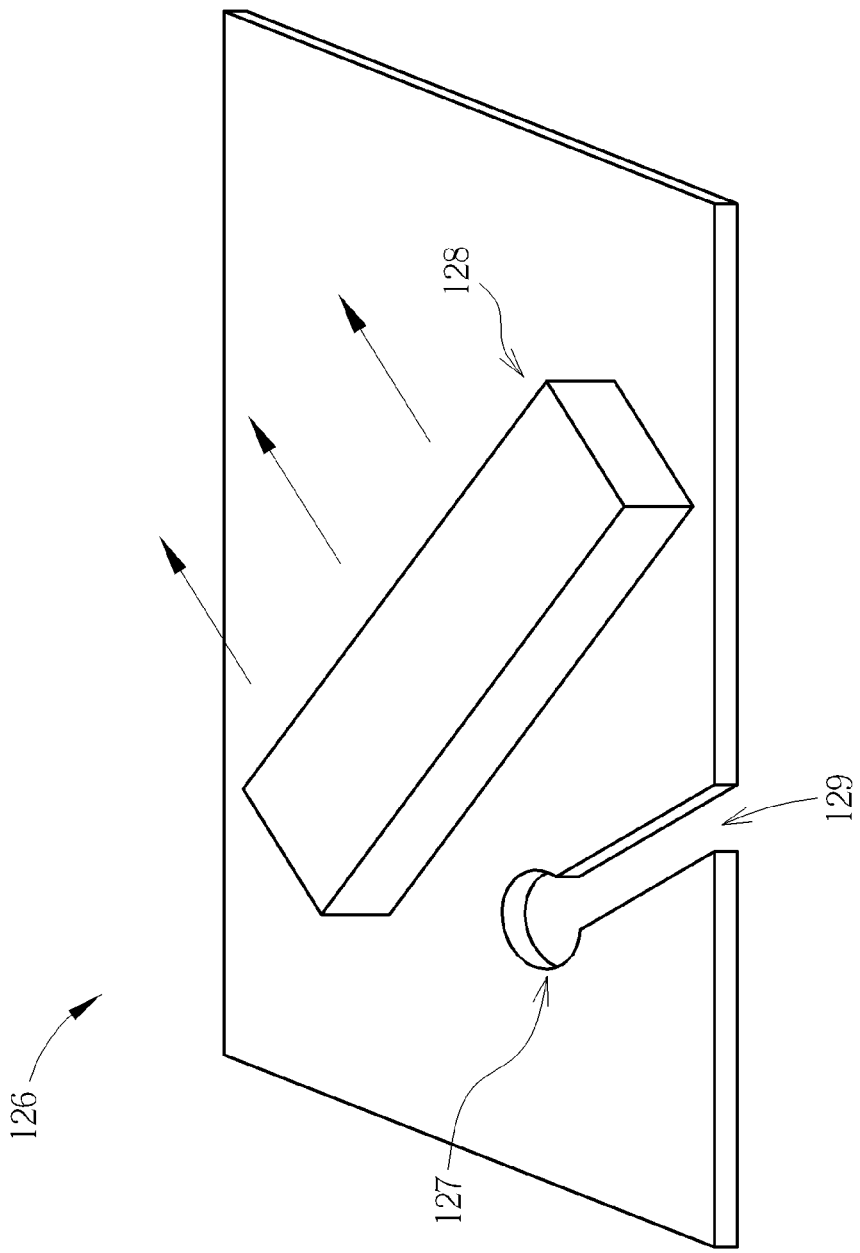
FIG. 4 is a diagram showing a light emitting module of the backlight module.

Please refer to FIG. 1 to FIG. 4 together. FIG. 1 is a diagram showing an explosive view of a backlight module of an embodiment of the present invention. FIG. 2 is a diagram showing assembly of the backlight module of the embodiment of the present invention. FIG. 3 is a diagram showing a side view of a reflection cover of the backlight module. FIG. 4 is a diagram showing a light emitting module of the backlight module. As shown in figures, the backlight module 100 comprises a light guide plate 110 and a light source structure 120. In the embodiment, the light guide plate 110 comprises two light incident surfaces 112 respectively arranged at two corners of the light guide plate 110. The light guide plate 110 further comprises a connecting surface 114 for connecting the two light incident surfaces 122. The light source structure 120 is arranged at one side of the light guide plate 110 for being combined with the light guide plate 110. The light source structure 120 comprises a reflection cover 122 and two light emitting modules 126. Two positioning pins 124 are arranged at positions on the reflection cover 122 corresponding to the two light incident surfaces 112 of the light guide plate 110. The light emitting modules 126 are arranged on the reflection cover 122 and respectively correspond to the two light incident surfaces 112 of the light guide plate 110. Each light emitting module 126 has a through hole 127 arranged at one side of a light emitting surface 128 of the light emitting module 126. The light emitting modules 126 can be respectively fixed on the positioning pins 124 in a rotatable manner via the through holes 127. When the reflection cover 122 is combined with the light guide plate 110, the reflection cover can cover a part of the light guide plate 110 and cover the connecting surface 114 and the two light incident surfaces 112.

In the above embodiment, since a height of the positioning pin 124 is greater than a height of the through hole 127, the through hole 127 is arranged in rear of the light emitting surface 128. However, in other embodiments of the present invention, when the height of the positioning pin 124 is less than the height of the through hole 127, the through hole 127 can be arranged in front of the light emitting surface 128. In addition, the through hole 127 is preferably arranged on a central axis of the light emitting surface 128, such that the light emitting surface 128 can adjust angles by rotating around the positioning pin 124 as an axis with same rotation level clockwisely and counter-clockwisely.

According to the above arrangement, when assembling the backlight module 100, the two positioning pins 124 can respectively pass through the through holes 127 of the two light emitting modules 126 for arranging the light emitting modules 126 on the reflection cover 122. Therefore, the light emitting modules 126 can rotate around the positioning pins 124 as axes with rotational degrees of freedom in the reflection cover 112. Thereafter, one side of the light guide plate 110 is pushed into the reflection cover 122 along a base plate 125 of the reflection cover 122, which further drives the light emitting modules 126 to rotate, such that the light emitting surfaces 128 of the light emitting modules 126 can face the two light incident surfaces 122 of the light guide plate 110, and contact with the two light incident surfaces 122 of the light guide plate 122 by a plane contact manner.

Figure 5:
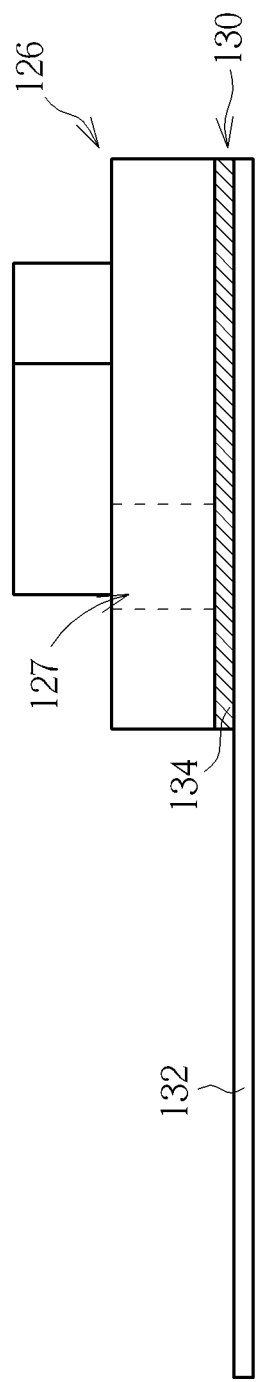
FIG. 5 is a diagram showing a method of the present invention for installing the light emitting module on the reflection cover.
Figure 6:
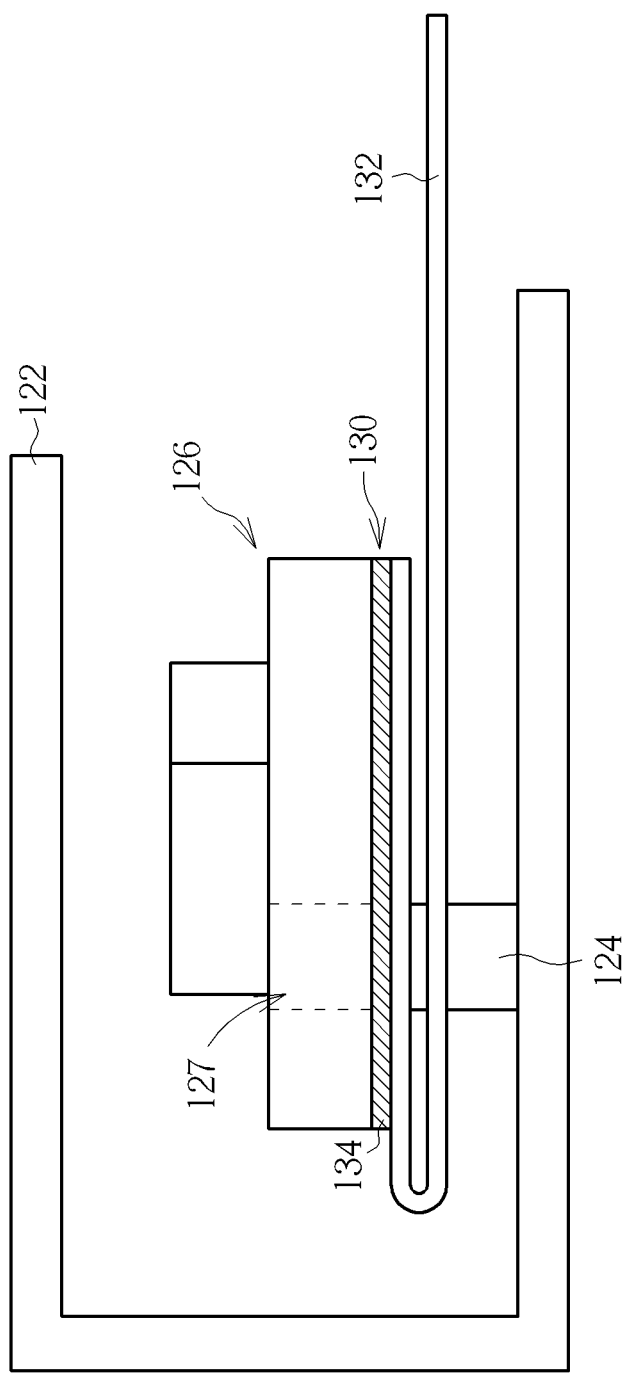
FIG. 6 is a diagram showing the method of the present invention for installing the light emitting module on the reflection cover.
Figure 7:
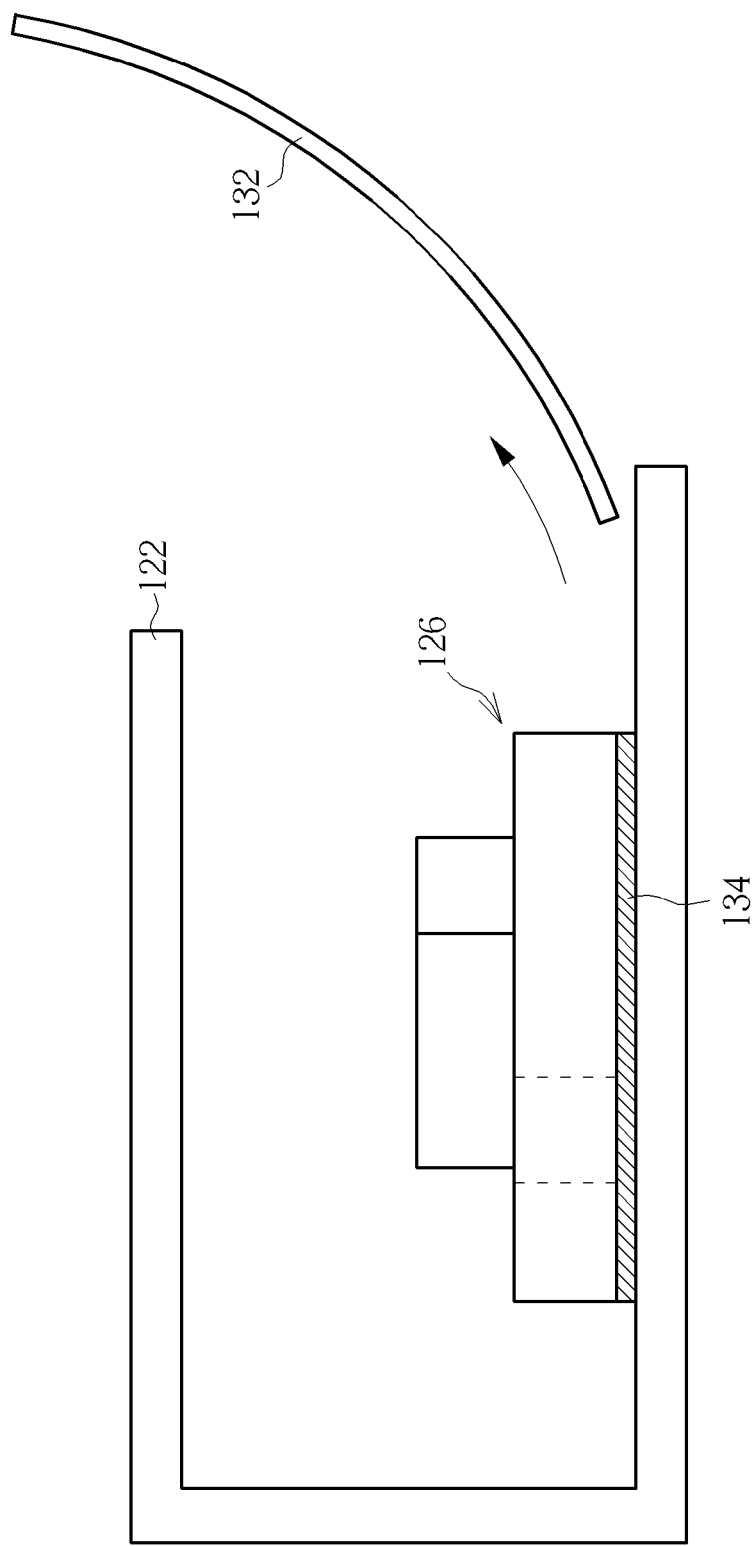
FIG. 7 is a diagram showing the method of the present invention for installing the light emitting module on the reflection cover.
Figure 8:
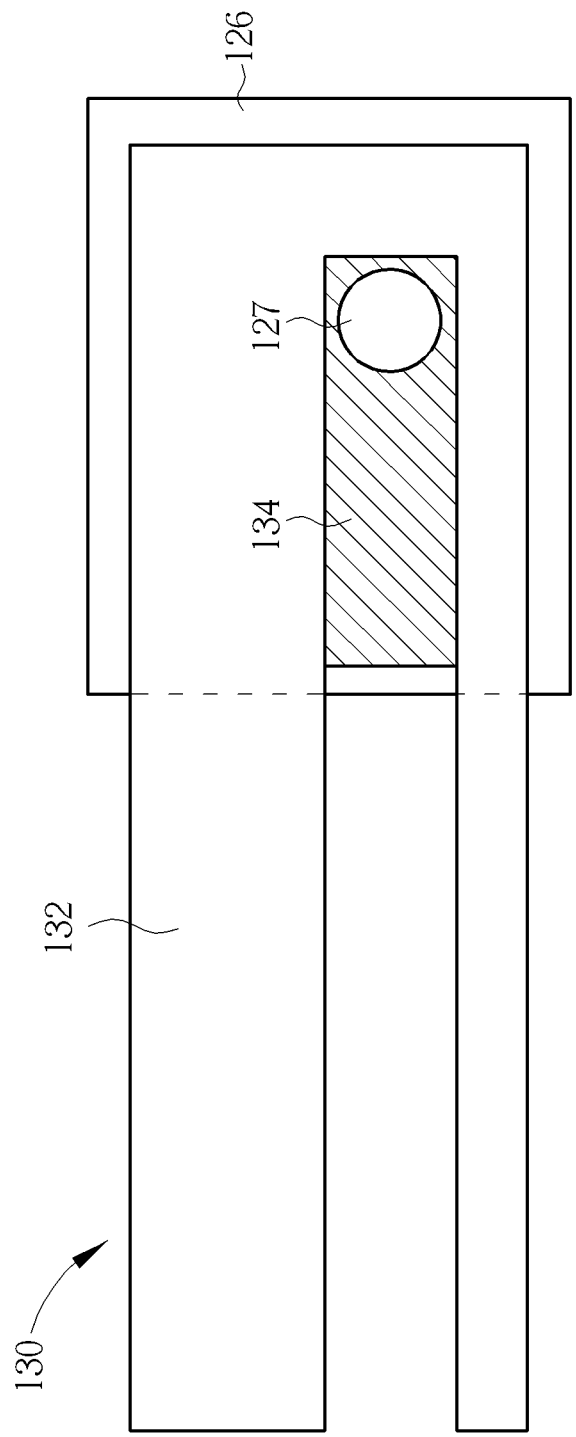
FIG. 8 is a diagram showing a double-sided tape being attached on a bottom of the light emitting module.

In addition, please refer to FIG. 5 to FIG. 7. FIG. 5 to FIG. 7 are diagrams showing a method of the present invention for installing the light emitting module 126 on the reflection cover 122. As shown in FIG. 5, before installing the light emitting modules 126 on the reflection cover 122, a double-sided tape 130 can be attached on the light emitting modules 126, and a length of a release paper 132 of the double-sided tape 130 is longer than a length of an adhesive surface 134. Thereafter, as shown in FIG. 6, the release paper 132 of the double-sided tape 130 is folded, such that the release paper 132 of the double-sided tape 130 can extend from an edge of the reflection cover 122. Finally, as shown in FIG. 7, after one side of the light guide plate 110 is combined with the reflection cover 122, the release paper 132 of the double-sided tape 130 is drawn out, and the light emitting modules 126 are pressed for being fixed on the reflection cover 122 via the adhesive surface 134. In addition, please refer to FIG. 8. FIG. 8 is a diagram showing the double-sided tape being attached on a bottom of the light emitting module. As shown in FIG. 8, an attachment range of the adhesive surface 134 should not cover the through hole 127, and the release paper 132 has an opening extending from the through hole 127 toward an edge of the of the light emitting module 126. Therefore, when the release paper 132 is folded and drawn out, the release paper 132 will not be interfered with the positioning pin 124.

Please refer to FIG. 4 again. A guiding slot 129 can be formed on the light emitting module 126 for guiding the positioning pin 124 to combine with the through hole 127 when installing the light emitting modules 126 on the reflection cover 122. In addition, the light emitting modules 126 are side-light type light emitting modules.

In the above embodiments, the backlight module 100 of the present invention is a side-light type backlight module, and light is incident at two corners of the light guide plate 110 of the backlight module 100 of the present invention. Therefore, the backlight module 100 of the present invention can be smaller and more efficient.

In contrast to the prior art, the light emitting module 126 of the backlight module 100 of the present invention can rotate when being assembled, such that the light emitting surface 128 of the light emitting module 126 can contact with the light incident surface 112 of the light guide plate 110 by a plane contact manner. Therefore, the backlight module 100 of the present invention can solve problems of light leakage and uneven backlight caused by detachment between the light emitting surface of the light emitting module and the light incident surface of the light guide plate, so as to further increase brightness and efficiency of the backlight module. In addition, the assembly method of the backlight module 100 of the present invention can easily adjust angles of the light emitting module 126 and then fix the light emitting module 126 on the reflection cover 122, so as to further improve assembly efficiency of the backlight module 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
   a light guide plate with at least one light incident surface; and
   a light source structure arranged at a side of the light guide plate, the light source structure comprising:
   a reflection cover arranged with at least one positioning pin; and
   at least one light emitting module installed on the reflection cover and corresponding to the at least one light incident surface, wherein the at least one light emitting module is fixed on the positioning pin in a rotatable manner, such that the at least one light emitting module is rotatable around the positioning pin as an axis when the reflection cover is combined with the light guide plate, so as to allow a light emitting surface of the at least one light emitting module facing the at least one light incident surface.

2. The backlight module of claim 1, wherein the light emitting surface of the at least one light emitting module contacts with the at least one light incident surface by a plane contact manner.

3. The backlight module of claim 1, wherein the light guide plate comprises two light incident surfaces, the reflection cover comprises two positioning pins, and the light source structure comprises two light emitting modules.

4. The backlight module of claim 3, wherein the light guide plate further comprises a connecting surface for connecting the two light incident surfaces, and the reflection cover is for covering a part of the light guide plate and for covering the connecting surface and the two light incident surfaces.

5. The backlight module of claim 1, wherein the least one light emitting module comprises a through hole.

6. The backlight module of claim 5, wherein the through hole is arranged in front or rear of the light emitting surface.

7. The backlight module of claim 6, wherein the through hole is arranged on a central axis of the light emitting surface.

8. The backlight module of claim 6, wherein when a height of the positioning pin is greater than a height of the through hole, the through hole is arranged in rear of the light emitting surface.

9. The backlight module of claim 5, wherein a guiding slot is formed on the at least one light emitting module for guiding the positioning pin to combine with the through hole.

10. The backlight module of claim 1, wherein the at least one light emitting module is a side-light type light emitting module.

11. A light source structure of a backlight module, comprising:
- a reflection cover arranged with at least one positioning pin; and
- at least one light emitting module installed inside the reflection cover, and fixed on the positioning pin in a rotatable manner, such that the at least one light emitting module is rotatable around the positioning pin as an axis when the reflection cover is combined with a light guide plate of the backlight module, so as to allow a light emitting surface of the at least one light emitting module facing a light incident surface of the light guide plate.

12. The light source structure of claim 11, wherein the at least one light emitting module comprises a through hole.

13. The light source structure of claim 12, wherein the through hole is arranged in front or rear of the light emitting surface.

14. The light source structure of claim 13, wherein the through hole is arranged on a central axis of the light emitting surface.

15. The light source structure of claim 12, wherein when a height of the positioning pin is greater than a height of the through hole, the through hole is arranged in rear of the light emitting surface.

16. The backlight module of claim 12, wherein a guiding slot is formed on the at least one light emitting module for guiding the positioning pin to combine with the through hole.

17. The backlight module of claim 11, wherein the at least one light emitting module is a side-light type light emitting module.

18. A method for assembling a backlight module, comprising:
- arranging a reflection cover, the reflection cover comprising at least one positioning pin;
- arranging the positioning pin to pass through a through hole of a light emitting module for installing the light emitting module on the reflection cover; and
- pushing one side of a light guide plate into the reflection cover along a base plate of the reflection cover, and driving the light emitting module to rotate, such that a light emitting surface of the light emitting module contacts with a light incident surface of the light guide plate by a plane contact manner.

19. The method for assembling the backlight module of claim 18, further comprising:
- attaching a double-sided tape on the light emitting module before installing the light emitting module on the reflection cover, wherein a length of a release paper is longer than a length of an adhesive surface of the double-sided tape;
- folding the release paper of the double-sided tape before installing the light emitting module on the reflection cover, such that the release paper of the double-sided tape can extend from an edge of the reflection cover; and
- drawing out the release paper of the double-sided tape after one side of the light guide plate is combined with the reflection cover.

* * * * *